(12) United States Patent
Klode et al.

(10) Patent No.: US 11,884,384 B2
(45) Date of Patent: Jan. 30, 2024

(54) SYSTEMS AND METHODS FOR LANDING GEAR ACTUATION VIA TRUNNION DRIVE

(71) Applicant: GOODRICH CORPORATION, Charlotte, NC (US)

(72) Inventors: Harald Klode, Centerville, OH (US); Kyle M. Madey, Broadview Hts, OH (US); Gerard Cox, Burlington (CN)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 17/839,149

(22) Filed: Jun. 13, 2022

(65) Prior Publication Data

US 2023/0399097 A1    Dec. 14, 2023

(51) Int. Cl.
*B64C 25/20* (2006.01)
*B64C 25/24* (2006.01)
*B64C 25/22* (2006.01)
*F16H 19/08* (2006.01)

(52) U.S. Cl.
CPC ............... *B64C 25/24* (2013.01); *B64C 25/20* (2013.01); *B64C 25/22* (2013.01); *F16H 19/08* (2013.01); *F16H 2019/085* (2013.01)

(58) Field of Classification Search
CPC ......... B64C 25/18; B64C 25/20; B64C 25/22; B64C 25/24; F16H 19/08; F16H 2019/085
See application file for complete search history.

(56) References Cited

U.S. PATENT DOCUMENTS

| | | |
|---|---|---|
| 1,737,596 A | 12/1929 | Lewis |
| 5,875,994 A | 3/1999 | McCrory |
| 2013/0026284 A1 | 1/2013 | Christensen |

FOREIGN PATENT DOCUMENTS

| | | | |
|---|---|---|---|
| EP | 3409584 | 12/2018 | |
| GB | 465278 | 5/1937 | |
| GB | 465278 A | * 5/1937 | ............. B64C 25/14 |
| GB | 595529 | 12/1947 | |
| WO | 2018120044 | 7/2018 | |

OTHER PUBLICATIONS

European Patent Office, European Search Report dated Oct. 19, 2023 in Application No. 23178789.6.

* cited by examiner

*Primary Examiner* — Tye William Abell
(74) *Attorney, Agent, or Firm* — SNELL & WILMER L.L.P.

(57) ABSTRACT

A landing gear actuation system is disclosed herein. The landing gear actuation system includes a trunnion sprocket coupled to a movable member, a drive motor, and a flexible drive member extending between and to the motor and the trunnion sprocket. The motor is configured to move the flexible drive member, wherein the movement of the flexible drive member moves the trunnion sprocket and the movable member. The flexible drive member may be a belt or a chain.

20 Claims, 6 Drawing Sheets

SYSTEMS AND METHODS FOR LANDING GEAR ACTUATION VIA TRUNNION DRIVE

FIELD

The present disclosure generally relates to the field of aircraft landing gear and, more particularly, to the actuation of aircraft landing gear.

BACKGROUND

Landing gear actuation systems generally utilize hydraulic components that work with a central or a localized hydraulic system. As aircraft become more advanced there is a need for an electric landing gear actuation system that does not use a hydraulic system.

SUMMARY

A landing gear actuation system is disclosed herein. The landing gear actuation system includes a trunnion sprocket coupled to a movable member, a flexible drive member coupled to the trunnion sprocket, and a motor configured to move the flexible drive member, wherein the movement of the flexible drive member moves the trunnion sprocket and the movable member.

In various embodiments, the flexible drive member is coupled to the motor.

In various embodiments, the motor is an electro-mechanical motor.

In various embodiments, the flexible drive member includes a first side having a plurality of ridges. In various embodiments, the motor is configured to engage the plurality of ridges to move the flexible drive member.

In various embodiments, the motor is configured to rotate as the movable member moves.

In various embodiments, the flexible drive member forms a closed loop.

In various embodiments, the flexible drive member is at least one of a drive chain or a drive belt.

In accordance with various embodiments, a landing gear actuation system is disclosed. The landing gear actuation system includes a trunnion sprocket coupled to a movable member, a first motor configured to move a flexible drive member, a second motor configured to move the flexible drive member, and a flexible drive member coupled to the trunnion sprocket and the first motor. The movement of the flexible drive member moves the trunnion sprocket and the movable member.

In various embodiments, the landing gear actuation system further comprises a first brake coupled between the first motor and a plurality of planetary reduction gears and a second brake coupled between the second motor and the plurality of planetary reduction gears.

In various embodiments, the landing gear actuation system further comprises a first clutch coupled between the first motor and the plurality of planetary reduction gears and a second clutch coupled between the second motor and the plurality of planetary reduction gears.

In various embodiments, the first motor and the second motor are configured to cooperatively turn a rotating ring gear.

In various embodiments, the flexible drive member is engaged with the rotating ring gear.

In various embodiments, the second motor is further configured to move the flexible drive member cooperatively with the first motor.

In various embodiments, the first motor is an electro-mechanical motor.

In various embodiments, the first motor is an electro-hydrostatic motor.

In various embodiments, the first motor is a hydro-mechanical motor.

In accordance with various embodiments, a landing gear for an aircraft is disclosed. The landing gear includes a landing gear assembly having a main strut, a wheel assembly coupled to the main strut of the landing gear assembly, and an actuation system configured to extend and retract the landing gear. The actuation system includes a trunnion sprocket coupled to the main strut, a first motor configured to move the landing gear assembly, and a flexible drive member extending between and to the trunnion sprocket and the first motor.

In various embodiments, the landing gear assembly further comprises a trunnion. In various embodiments, the trunnion sprocket is concentric with the trunnion.

In various embodiments, the landing gear further comprises a second motor configured to move the flexible drive member cooperatively with the first motor.

In various embodiments, the first motor and the second motor are configured to cooperatively turn a rotating ring gear. In various embodiments, the flexible drive member is engaged with the rotating ring gear.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a mechanism of extending and retracting an aircraft landing gear. The mechanism, in various embodiments, provides packaging flexibility and allows for the use of an electro-mechanical motor (or electro-hydrostatic motor or hydro-mechanical motor) instead of a linear ball or roller screw mechanism. This reduces or eliminates failure modes associated with ball or roller screws that would prevent emergency deployment of landing gear, in various embodiments.

According to various embodiments, landing gear retraction and extension is accomplished via a drive system including an electric drive motor/drive unit, a drive connection/flexible drive member (belt, chain, etc.) that is attached between the landing gear trunnion and the electric drive motor, and a trunnion gear/sprocket. In various embodiments, the landing gear/sprocket includes an integrated torque augmentation device (planetary gear, etc.). In various embodiments, a rotary retardation/braking/damping device (friction, viscous, magneto-rheological, etc.) is attached to the trunnion gear/sprocket and used to control landing gear descend and bounce under alternate (emergency) release conditions. The drive unit may further be configured as a dual-motor system with differential gearing and controllable brakes and/or clutches to provide redundancy and failure mode mitigation.

A landing gear actuation system of the present disclosure may allow for elimination of complex folding multi-bar linkage and retraction systems. A landing gear actuation system of the present disclosure may allow for smaller actuation package size compared to legacy system (e.g., hydraulic actuation systems). A landing gear actuation system of the present disclosure may reduce or eliminate risk of jamming failure modes of a ball or roller screw. Failure modes of current systems, such as those associated with ball and/or roller screws that prevent landing gear emergency deployment are eliminated. A landing gear actuation system of the present disclosure may operate without a centralized or local hydraulic system. Aircraft without a centralized hydraulic system will benefit from improved space savings and performance disclosed herein. Furthermore, removing hydraulic fluid from the landing gear retraction system results in elimination of fluid leaks. A landing gear actuation system of the present disclosure may provide redundancy to provide failure mode mitigation. Additionally, packaging flexibility may be accomplished through different storage configurations of flexible drive members as compared to the fixed storage used by the hydraulic actuator of current systems.

Figure 1:
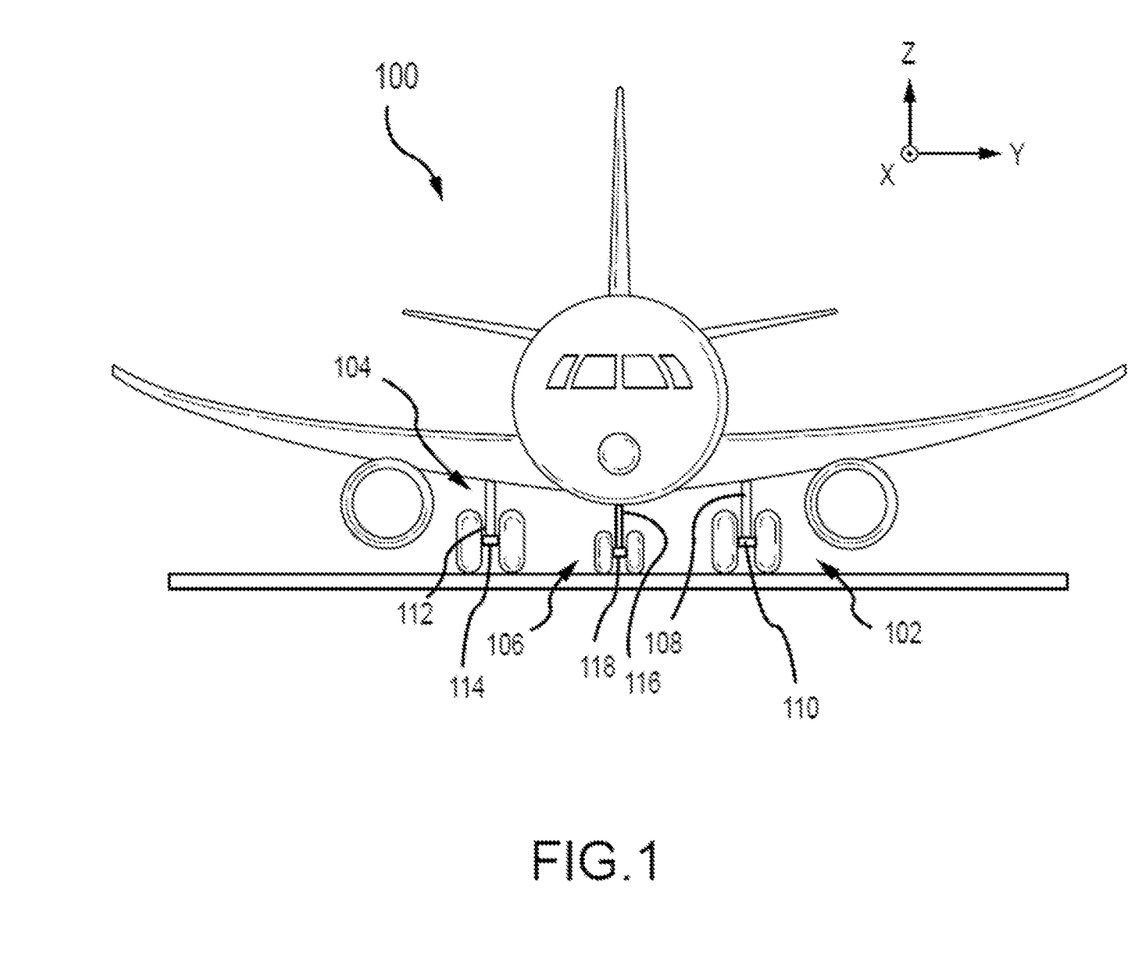
FIG. 1 illustrates an aircraft having a landing gear assembly and wheels mounted thereon, according with various embodiments.

Referring to FIG. 1, illustrated is a representative aircraft 100, according to various embodiments of the present disclosure. The aircraft 100 may include one or more landing gear, such as, for example, a left landing gear 102 (or port-side landing gear), a right landing gear 104 f (or starboard-side landing gear) and a nose landing gear 106. Each of the left landing gear 102, the right landing gear 104 and the nose landing gear 106 may support the aircraft 100 when not flying, allowing the aircraft 100 to taxi, takeoff, and land, safely and without damage to the aircraft. The left landing gear 102 may include a left landing gear assembly 108 that includes a left wheel assembly 110, the right landing gear 104 may include a right landing gear assembly 112 that includes a right wheel assembly 114 and the nose landing gear 106 may include a nose landing gear assembly 116 that includes a nose wheel assembly 118.

Figure 2A:
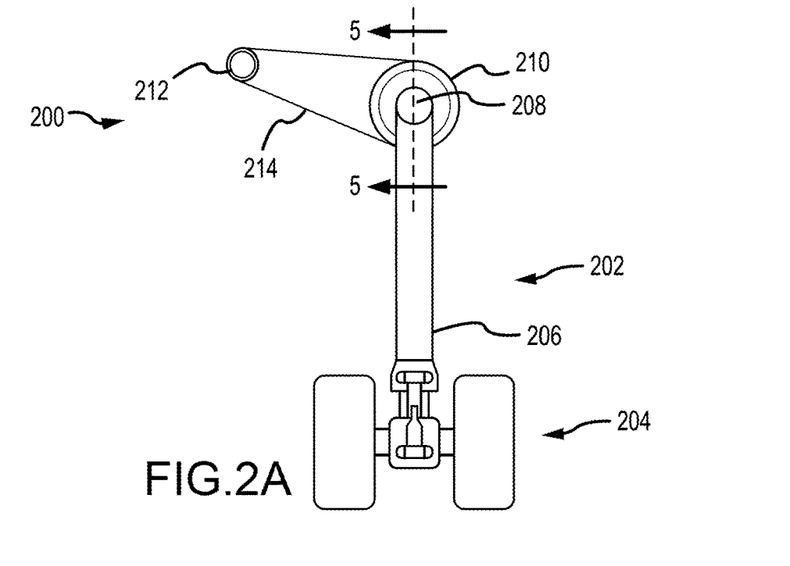
FIG. 2A, FIG. 2B, and FIG. 2C illustrate an exemplary landing gear actuation system using a flexible transmission member, according to various embodiments.
Figure 2B:
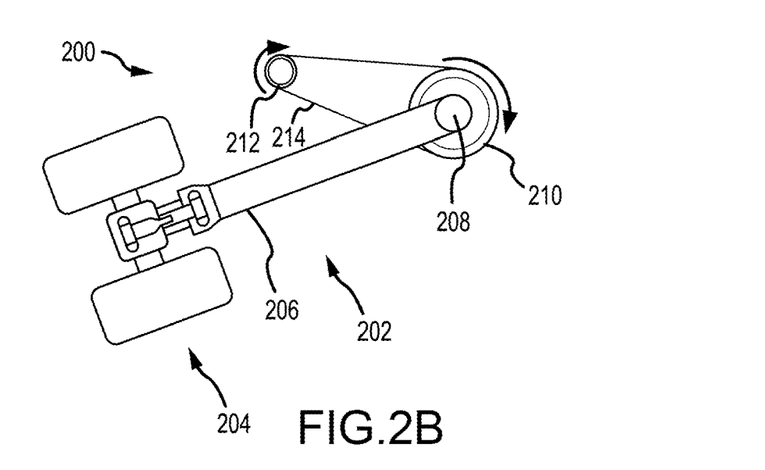
Figure 2C:
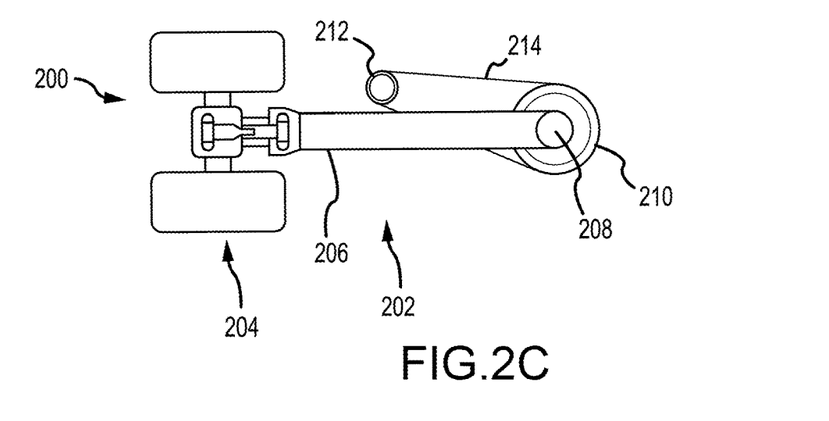

Referring now to FIGS. 2A-2C, illustrated is an exemplary landing gear 200 in multiple positions during an extending or retracting procedure, according to various embodiments of the present disclosure. Landing gear 200 may be an example of left landing gear 102, right landing gear 104, or nose landing gear 106. Landing gear 200 includes a landing gear assembly 202 and a wheel assembly 204. Landing gear assembly 202 includes a main strut 206 and a trunnion 208. As illustrated in FIGS. 2A-2C, landing gear assembly 202 rotates about trunnion 208 during extending and retracting procedures. In the fully extended position, as shown in FIG. 2A, main strut 206 is rotated away from an aircraft body and provides support for the aircraft, to rest against a ground surface for example. In various embodiments, landing gear assembly 202 further includes other linkages or supports for maintaining the main strut 206 in the fully extended position, such as a side stay, a locking link, etc.

In various embodiments, an actuation system of landing gear 200 includes a trunnion sprocket 210, a motor 212, and a flexible drive member 214 extending around trunnion sprocket 210 and around motor 212 in a closed loop manner. Stated differently, flexible drive member 214 may form a closed loop. Trunnion sprocket 210 is coupled to a movable member (e.g., main strut 206) at the trunnion 208. Trunnion sprocket 210 may be concentric with trunnion 208. In this regard, trunnion sprocket 210 and trunnion 208 may rotate together about a common axis. The working diameter of trunnion sprocket 210 (i.e., the diameter of trunnion sprocket 210 at the location of engagement with flexible drive member 214) may be determined by various parameters such as, for example, extension and retraction torque at trunnion sprocket 210, storage arrangement of flexible drive member 214, parameters for forces when on the ground, total travel of landing gear assembly 202 during retraction and extension, just to name a few.

Motor 212 provides the force to rotate flexible drive member 214 in a first direction (e.g., clockwise in FIG. 2B) to retract landing gear 200 in a controlled manner. Motor 212 provides the force to rotate flexible drive member 214 in a second direction (e.g., counter-clockwise in FIG. 2B) in a controlled manner to extend or retract, respectively, landing gear 200. In various embodiments, motor 212 is an electro-mechanical motor. In various embodiments, motor 212 is an electro-hydrostatic motor. In various embodiments, motor 212 is a hydro-mechanical motor. In various embodiments, the motive force to move flexible drive member 214 may be located within the landing gear storage bay. In various embodiments, motor 212 includes a sprocket, cog, pinion, gear, rollers, or other means, to control flexible drive member 214. In various embodiments, motor 212 is mounted to the aircraft to enable motor 212 to exert a rotational force (e.g., torque) on and trunnion sprocket 210 via flexible drive member 214 during the process of extending and retracing landing gear assembly 202.

Flexible drive member 214 is coupled to trunnion sprocket 210 and motor 212. Flexible drive member 214 reduces the overall storage space used by landing gear 200 by removing the bulky hydraulic member previously used to control extending and retracting of landing gear 200. Flexible drive member 214 may be a belt, chain, or other suitable mechanism. In various embodiments, flexible drive member 214 is made from a metal or metal alloy material. Flexible drive member 214 may be a metal chain such as a roller chain, a silent chain, a leaf chain, a flat-top chain, or an engineering steel chain, just to name a few. In various embodiments, flexible drive member 214 is made from a rubber, a synthetic polymer, and/or a fabric-reinforced polyurethane. Flexible drive member 214 may be belt, such as a round belt, a flat belt, a v-belt, a toothed belt, or a link belt, just to name a few. As flexible drive member 214 is engaged by motor 212, flexible drive member 214 is driven around motor 212 to extend or retract landing gear assembly 202. In various embodiments, flexible drive member 214 rotates about trunnion sprocket 210 as motor 212 engages flexible drive member 214. Stated differently, rotation of trunnion sprocket 210 is driven by motor 212 via the flexible drive member 214.

During the process of retracting landing gear assembly 202, flexible drive member exerts a force on main strut 206 at trunnion sprocket 210 thereby pulling landing gear assembly 202 up and into the landing gear storage bay. This process is illustrated by FIGS. 2A-2C. As illustrated in FIG. 2A, landing gear assembly 202 is fully extended. As motor 212 activates, rotational torque generated by motor 212 is transferred to trunnion sprocket 210 via flexible drive member 214, thereby moving landing gear assembly laterally. As depicted in FIG. 2B, motor 212 is activated and turns flexible drive member 214, thereby rotating main strut 206 at trunnion sprocket 210. This force causes landing gear assembly 202 to move laterally (e.g., to the left as depicted). In various embodiments, motor 212 rotates during the retracting process in order to apply consistent force to flexible drive member 214. As illustrated in FIG. 2C, landing gear assembly 202 is fully retracted with motor 212 and flexible drive member 214 holding landing gear assembly 202 in place. This configuration may provide for storage of landing gear assembly 202 with minimal energy expenditure. For example, motor 212 may lock to prevent flexible drive member 214 from turning in response to movement of landing gear assembly 202. In various embodiments, trunnion sprocket 210 may additionally or alternatively lock to prevent landing gear assembly 202 from moving toward an extended position.

During the extension of landing gear assembly 202, the process described above is reversed. For example, the extension process begins at FIG. 2C. Motor 212 turns flexible member 220 in a consistent and controlled manner to safely lower landing gear assembly 202. At FIG. 2B, the extension process may be continued with landing gear assembly 202 being lowered further until landing gear assembly 202 is fully extended as depicted in FIG. 2A.

In various embodiments, a brake and/or rotary hydraulic dampener is provided to aid in the extending process ensuring that landing gear assembly 202 extends in a controlled manner. In various embodiments, the brake and/or rotary hydraulic dampener is provided at the trunnion sprocket 210 axis. During the extension process, motor 212 may monitor force(s) in flexible drive member 214 to maintain proper tension and eliminate slack or reverse torque in flexible drive member 214 to provide a consistent and safe extension of landing gear assembly 202. The brake and/or rotary hydraulic dampener may aid motor 212 by managing unpredictable loads on flexible drive member 214 such as acceleration, climbing, banking, turbulence, and so forth. In various embodiments, the dampener may be part of a system, such as including a spring, to provide a controlled descent of landing gear assembly 202 should power be lost to motor 212.

In various embodiments, motor 212 comprises a four-quadrant capability used to control the following landing gear modes: (i) gravity-aided deployment—the drive motor 212 acts as a brake; (ii) non-gravity-aided deployment—the drive motor 212 acts as a motor to pull the landing gear to the extended (e.g., deployed or down) position; (iii) retraction against gravity—the drive motor 212 acts as a motor; or (iv) retraction aided by gravity/aircraft dynamics—the drive motor 212 acts as a brake.

In various embodiments, the drive system may provide added flexibility with respect to configuration in the wheel bay and could be shrouded for protection from debris, ice, air loads, etc. In various embodiments, multiple flexible drive member 214 may be used to provide backup redundancy and failure capability.

Figure 3:
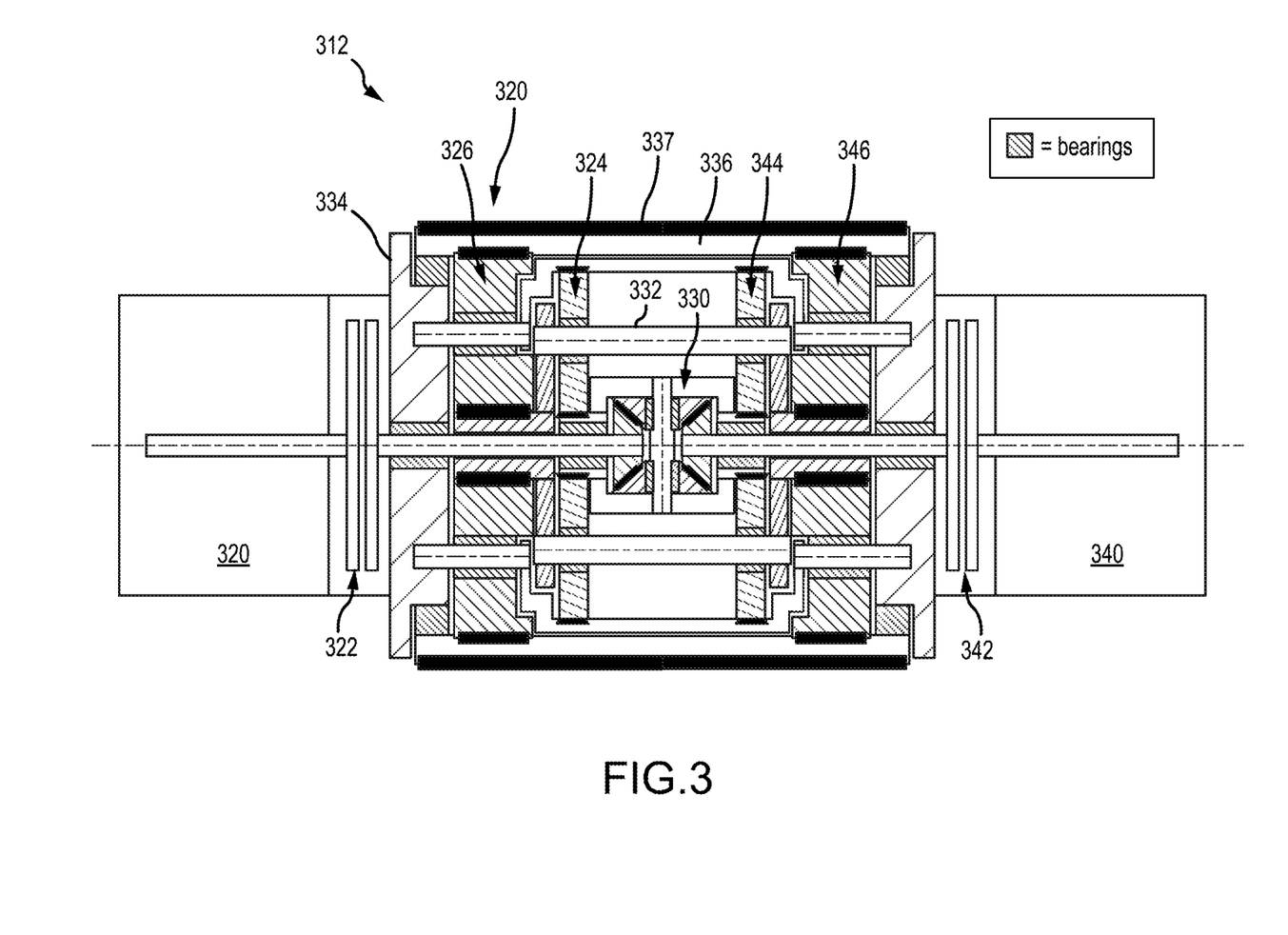
FIG. 3 illustrates an exemplary dual-motor drive unit, according to various embodiments.

Referring now to FIG. 3, illustrated is an exemplary dual-motor drive unit 312 for use in a landing gear actuation system, according to various embodiments of the present disclosure. In various embodiments, dual-motor drive unit 312 may be an example of motor 212 described above with respect to FIG. 2A through FIG. 2C. Dual-motor drive unit 312 may be configured as a differential gearing with controllable brakes and/or clutches to provide redundancy and failure mode mitigation (e.g., locked motor, loss of a drive channel, etc.). Dual-motor drive unit 312 includes a first motor 320 and a second motor 340. First motor 320 and second motor 340 may drive, via two controllable clutch units (e.g., first clutch 322 and second clutch 342, respectively) and a differential bevel gear assembly 330, planetary reduction gears (e.g., first stage planet gears 324, 344 and second stage planet gears 326, 346). The planetary reduction gears may include a first set of first stage planet gears 324 and a second set of first stage planet gears 344. First set of first stage planet gears 324 and a second set of first stage planet gears 344 may be rotatably coupled to a shaft 332 (e.g., via respective bearings). The planetary reduction gears may include a first set of second stage planet gears 326 and a second set of second stage planet gears 346. The planetary gear's second stage features a stationary planet carrier 334 and provides rotational output via a rotating ring gear 336. In this manner, both first motor 320 and second motor 340 may be configured to cooperatively turn rotating ring gear 336. The first set of second stage planet gears 326 and the second set of second stage planet gears 346 may be rotatably mounted to stationary planet carrier 334. Rotating ring gear 336 may include external teeth 337 that engage a flexible drive member (e.g., flexible drive member 214).

Figure 4:
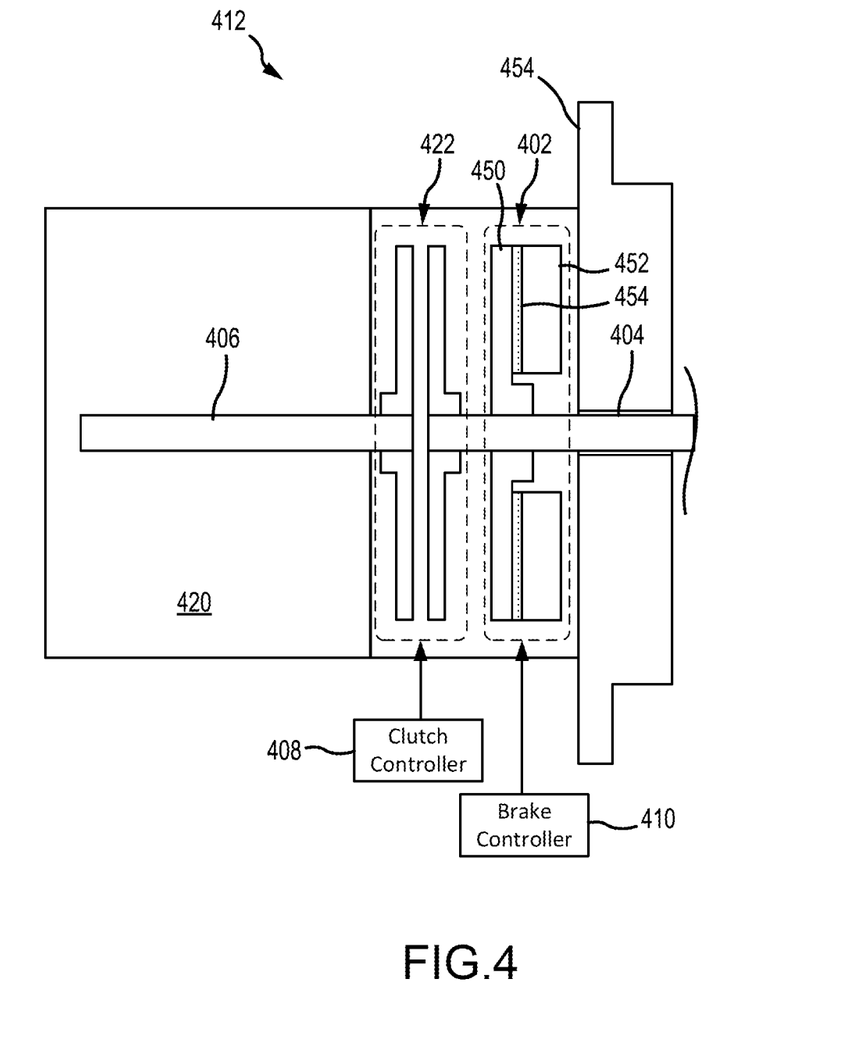
FIG. 4 illustrates a portion of an exemplary dual-motor drive unit having a clutch and a brake, according to various embodiments.

Referring now to FIG. 4, a section of a drive unit 412 for use in a landing gear actuation system of the present disclosure is illustrated, in accordance with various embodiments. Drive unit 412 may be similar to drive unit 312, except that drive unit 412 further includes a brake 402 operatively coupled to the gear shaft 404. In various embodiments, drive unit 312 is arranged with a clutch 422 and brake 402 similar to drive unit 412. Drive unit 412 includes a clutch 422, which in various embodiments is similar to clutch 322 as described in FIG. 3, which is operatively coupled between the motor shaft 406 and the gear shaft 404. In this regard, motor 420 may be operated to control a rotation of motor shaft 406. Clutch 422 is moveable between an open position, whereby the gear shaft 404 is decoupled from the motor shaft 406, and a closed position, whereby the gear shaft 404 is coupled to, and rotates together with, the motor shaft 406. A clutch controller 408 may control the state of the clutch 422. Clutch 422 may be in a normally open (or disengaged) position.

BS3). In this manner, the brake torque in this mode may be zero, or very close to zero (no friction torque) and may not affect rotation of gear shaft 404.

With combined reference to FIG. 3 and FIG. 4, each clutch (e.g., clutch 322 (or clutch 422) and clutch 342) can be controlled to provide the following states: CS1: power on—couples motor output with differential gear input; CS2: power off—decouples motor output (e.g., torsional output from motor 320 and/or motor 340) from differential gear input (e.g., torsional input to differential bevel gear assembly 330).

Table 1 provides various operating modes (and more particularly the operating mode of the motors, brakes, and clutches) of dual-motor drive unit 312.

TABLE 1

Operating Modes of Dual-Motor Drive Unit

| Failure Mode | Brake/Clutch/Motor States (to provide Failure Mode Mitigation) | Resulting Operating Mode |
| --- | --- | --- |
| None | Both brakes and clutches: BS3 (open); CS1 (engaged). | Both motors are operated at identical speeds. The differential gear output rotates at motor speed. |
| One of the motors or drives fails (no output torque and/or motor can't rotate freely) | Failed section: Brake: BS2 (locked); Clutch: CS2 (disengaged) Healthy section: Brake: BS3 (open); Clutch: CS1 (engaged) | The healthy motor continues to operate and drives the differential gear output at half the motor speed. |
| One of the clutches fails (no connection between motor and differential gear) | Failed section: Brake: BS2 (locked) Healthy section: Brake: BS3 (open); Clutches: CS1 (engaged) | The healthy motor continues to operate and drives the differential gear output at half the motor speed. |
| One of the brakes fails (brake torque present at all times) | Failed section: Clutch: CS1 (engaged); Motor: driven at reduced speed (determined by motor torque capability) Healthy section: Brake: BS3 (open); Clutch: CS1 (engaged) | Both motors continue to operate and drive the differential gear at different input speeds. The differential gear output rotates at the average of the two motor speeds. |
| Both motors or drives fail (no output torques and/or motors can't rotate freely) | Both brakes and clutches: BS1 (viscous); CS2 (disengaged). | The Landing Gear (LG) can be manually released. LG backdrives the brakes through the gear train, with the brakes' viscous friction controlling the LG descend rate. |
| Complete loss of system power | Both brakes and clutches: BS1 (viscous); CS2 (disengaged). | The LG can be manually released. LG backdrives the brakes through the gear train, with the brakes' viscous friction controlling the LG descend rate. |

Figure 5:
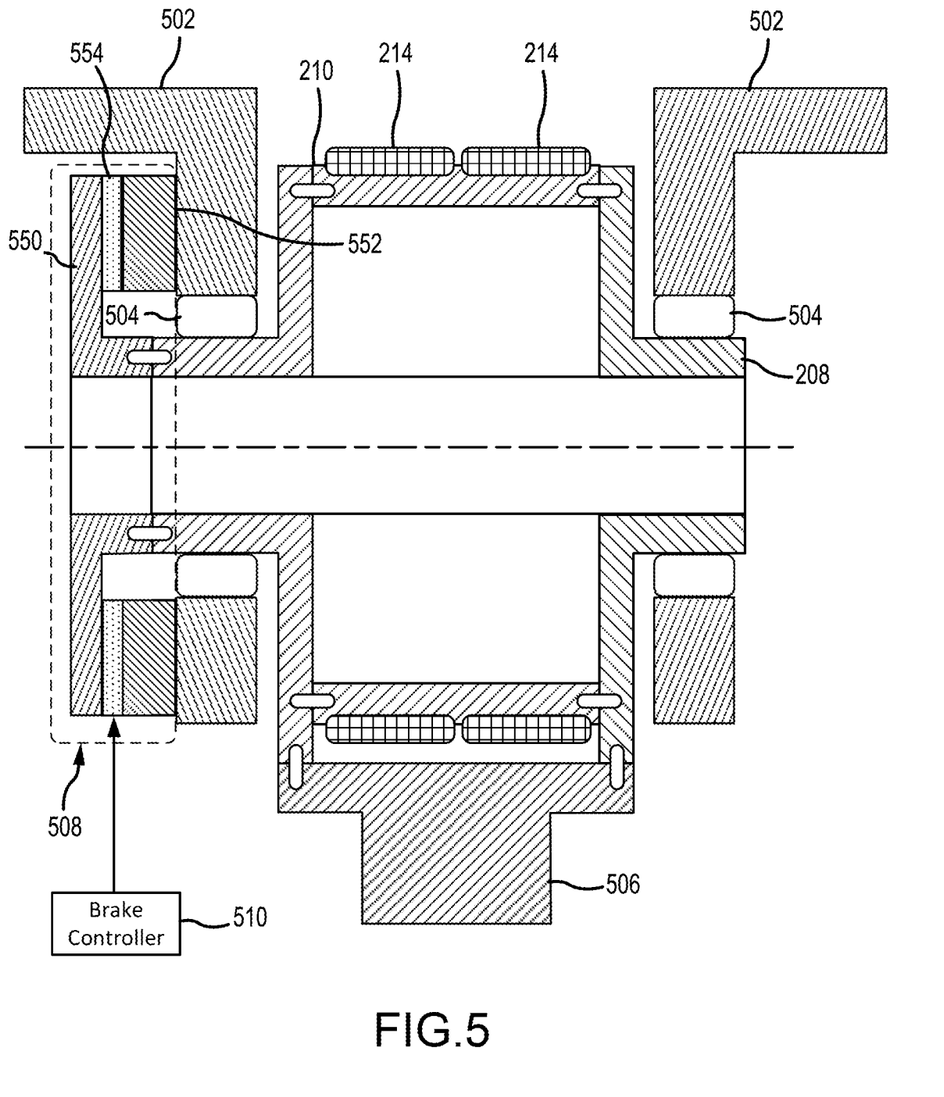
FIG. 5 illustrates a section view of a trunnion arrangement installed onto an aircraft structure, according to various embodiments.

In various embodiments, brake 402 includes a rotor 450 which rotates together with the gear shaft 404. Brake 402 further includes a stator 452. Stator 452 may be fixed with respect to gear housing 454. During operation, brake controller 410 may control a coupling element 454 (e.g., an electro-magnetic friction plate, a magneto-rheological fluid with permanent magnet field bias, etc.) to control the following brake modes: BS1: power off—fixed friction torque; BS2: power on (level 1)—locks the differential gear input; BS3: power on (level 2)—no friction torque. In mode BS1, the brake 402 may not be controlled or energized. In this manner, the brake torque may be solely determined by the viscous friction properties of the brake's coupling element 454. In mode BS2, the brake 402 may be energized to a first level (level 1; e.g., with a specific control current magnitude that invokes mode BS2). In this manner, the brake torque in this mode may be sufficiently high to prevent any gear shaft rotation (i.e., it "locks" the gear shaft 404). In mode BS3, the brake 402 may be energized to a second level (level 2; e.g., with a specific control current magnitude that invokes mode Referring now to FIG. 5, a section view of trunnion 208 in an installed position is illustrated, in accordance with various embodiments. FIG. 5 illustrates dual flexible drive members 214 installed over trunnion sprocket 210. Trunnion 208 is illustrated mounted to an aircraft structure 502 via bearings 504. The landing gear structure 506 (e.g., a shock strut) may be mounted to trunnion 208. Moreover, a brake 508 may be employed with trunnion 208. Brake 508 may include a rotor 550 which rotates together with the trunnion 208. In various embodiments, rotor 550 is attached to the trunnion 208. Brake 508 may further include a stator 552. Stator 552 may be fixed with respect to the aircraft structure 502. During operation, brake controller 510 may control a coupling element 554 (e.g., an electro-magnetic friction plate, a magneto-rheological fluid with permanent magnet field bias, etc.) to control a braking mode of the brake 508. In various embodiments, brake 508 and brake controller 510 are similar to brake 402 and brake controller 410, respectively, as described with respect to FIG. 4.

Figure 6:
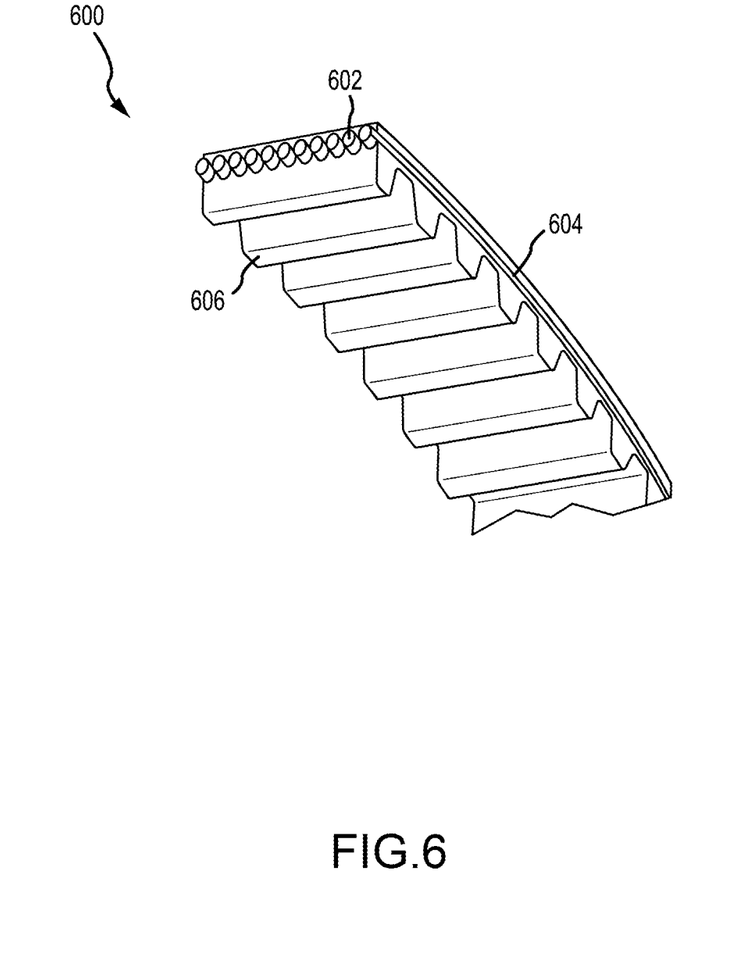
FIG. 6 illustrates an exemplary flexible transmission member, according to various embodiments.

Referring now to FIG. 6, illustrated is an exemplary flexible drive member 600 for use in a landing gear actuation system, according to various embodiments of the present disclosure. In various embodiments, flexible drive member 600 may be an example of flexible drive member 214 described above with respect to FIG. 2A through FIG. 2C. Flexible drive member 600 includes a plurality of flexible cables 602, a top layer 604, and a ridged bottom layer 606. Flexible cables 602 may be made from carbon fibers or any other suitable material that can support a tight bending radius. Flexible cables 602 provide strength and support for flexible drive member 600. There may be more or fewer flexible cables 602 than depicted. Top layer 604 provides an upper material layer to provide support and rigidity for the plurality of flexible cables 602. Ridged bottom layer 606 includes a plurality of ridges that are configured to engage with a drive motor, such as motor 212 for example and a trunnion sprocket, such as trunnion sprocket 210 for example. The top layer 604 and ridged bottom layer 606 may be manufactured of the same material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A landing gear actuation system, comprising:
   a trunnion sprocket coupled to a movable member;
   a flexible drive member coupled to the trunnion sprocket;
   a motor configured to move the flexible drive member, wherein movement of the flexible drive member moves the trunnion sprocket and the movable member; and
   a first brake coupled between the motor and a plurality of planetary reduction gears, and the motor is configured to move the flexible drive member to rotate the movable member via the planetary reduction gears.

2. The landing gear actuation system of claim 1, wherein the flexible drive member is coupled to the motor via the first brake.

3. The landing gear actuation system of claim 1, wherein the flexible drive member includes a first side having a plurality of ridges; and
   wherein the motor is configured to engage the plurality of ridges to move the flexible drive member.

4. The landing gear actuation system of claim 1, wherein the movable member is configured to rotate about a trunnion in response to the flexible drive member moving the trunnion sprocket and the movable member, and the trunnion sprocket is mounted to the trunnion.

5. The landing gear actuation system of claim 1, wherein the flexible drive member forms a closed loop.

6. The landing gear actuation system of claim 5, wherein the flexible drive member is at least one of a drive chain or a drive belt.

7. The landing gear actuation system of claim 1, further comprising:

a stationary planet carrier; and
a rotating ring gear, the flexible drive member is configured to rotate the rotating ring gear with respect to the stationary planet carrier.

8. The landing gear actuation system of claim 7, further comprising a clutch coupled between the motor and the plurality of planetary reduction gears.

9. The landing gear actuation system of claim 7, further comprising a second brake located at the trunnion and configured to lock the trunnion from rotating with respect to an aircraft structure.

10. A landing gear actuation system, comprising:
a trunnion sprocket coupled to a movable member;
a first motor configured to move a flexible drive member;
a second motor configured to move the flexible drive member;
a flexible drive member coupled to the trunnion sprocket and the first motor, wherein movement of the flexible drive member moves the trunnion sprocket and the movable member;
a first brake coupled between the first motor and a plurality of planetary reduction gears; and
a second brake coupled between the second motor and the plurality of planetary reduction gears.

11. The landing gear actuation system of claim 10, further comprising a first clutch coupled between the first motor and the plurality of planetary reduction gears and a second clutch coupled between the second motor and the plurality of planetary reduction gears.

12. The landing gear actuation system of claim 10, wherein the second motor is further configured to move the flexible drive member cooperatively with the first motor.

13. The landing gear actuation system of claim 10, wherein the first motor is an electro-mechanical motor.

14. The landing gear actuation system of claim 10, wherein the first motor is an electro-hydrostatic motor.

15. The landing gear actuation system of claim 10, wherein the first motor is a hydro-mechanical motor.

16. The landing gear actuation system of claim 10, wherein the first motor and the second motor are configured to cooperatively turn a rotating ring gear.

17. The landing gear actuation system of claim 16, wherein the flexible drive member is engaged with the rotating ring gear.

18. A landing gear for an aircraft, comprising:
a trunnion configured to be rotatably mounted to an aircraft structure;
a landing gear assembly having a main strut mounted to the trunnion;
a wheel assembly coupled to the main strut of the landing gear assembly; and
an actuation system configured to extend and retract the landing gear, the landing gear is configured to rotate about the trunnion in response to the actuation system at least one of extending and retracting the landing gear, the actuation system including:
a trunnion sprocket coupled to the main strut, the trunnion sprocket is concentric with the trunnion;
a first motor configured to move the landing gear assembly; and
a flexible drive member extending between and to the trunnion sprocket and the first motor.

19. The landing gear of claim 18, further comprising a second motor configured to move the flexible drive member cooperatively with the first motor.

20. The landing gear of claim 19, wherein the first motor and the second motor are configured to cooperatively turn a rotating ring gear; and
the flexible drive member is engaged with the rotating ring gear.

* * * * *